United States Patent [19]

Calkins

[11] 3,971,863
[45] July 27, 1976

[54] COATED HEAT FUSIBLE INJECTION MOLDABLE PHENOL-ALDEHYDE PELLETS

[75] Inventor: Thornton R. Calkins, Pittsfield, Mass.

[73] Assignee: General Electric Company, Pittsfield, Mass.

[22] Filed: Aug. 23, 1974

[21] Appl. No.: 500,114

Related U.S. Application Data

[63] Continuation-in-part of Ser. No. 304,016, Nov. 6, 1972, abandoned.

[52] U.S. Cl. .................................. 428/407; 427/222
[51] Int. Cl.² ......................................... B32B 27/42
[58] Field of Search ................ 117/100 C, 138.8 G, 117/167; 260/19 R, 19 N; 427/222; 428/407

[56] References Cited
UNITED STATES PATENTS

| | | | |
|---|---|---|---|
| 2,839,422 | 6/1958 | Beyer et al. | 117/100 C |
| 2,943,068 | 6/1960 | Freedman | 260/19 N |
| 2,989,782 | 6/1961 | Barkhuff et al. | 117/100 C |
| 3,106,540 | 10/1963 | Freedman | 260/19 N |

FOREIGN PATENTS OR APPLICATIONS

| | | | |
|---|---|---|---|
| 19,385 | 7/1970 | Japan | 260/19 N |

*Primary Examiner*—Ronald H. Smith
*Assistant Examiner*—Dennis C. Konopack
*Attorney, Agent, or Firm*—Donald M. Papuga; William F. Mufatti

[57] ABSTRACT

Phenol-aldehyde injection moldable pellets are disclosed which are coated with a composition which comprises (1) a metallic salt of a long chain fatty acid of 8–20 carbon atoms and (2) a material selected from the group consisting of (a) an alkyl ester of an aromatic acid, (b) an alkyl ester of an aliphatic acid, (c) mixtures of (a) and (b), and (d) mixtures selected from the group consisting of (a), (b), and (c) with a material selected from the group consisting of polyglycols, polyglycol esters and mixtures of polyglycols and polyglycol esters.

8 Claims, No Drawings

COATED HEAT FUSIBLE INJECTION MOLDABLE PHENOL-ALDEHYDE PELLETS

This application is a continuation-in-part application of patent application Ser. No. 304,016, filed Nov. 6, 1972, and now abandoned.

This invention is directed to a dust free heat fusible improved injection moldable phenol-aldehyde composition in pellet form and more particularly to such pellets having a coating thereon.

BACKGROUND OF THE INVENTION

Phenolic molding compositions have been available for many years and generally consist of phenol-formaldehyde resin blended with various fillers. The molding compositions are prepared by blending a one-stage or two-stage phenol-formaldehyde resin with fillers and then working the material between differential hot rolls in order to soften the resin and obtain a more uniform blend of the constituents. The composition is then cooled, crushed, screened for some degree of uniformity of particle size. Unfortunately, such molding compositions are dusty, lack uniform size, and do not lend themselves readily to the new method of injection molding of thermosettable resins. The time of contact with the hot rolls is critical, and the process does not result in a uniform blend of all the constituents as well as being costly because of the many steps to the final molding composition.

While it has been disclosed in patent application Ser. No. 500,113 filed Aug. 23, 1974 of Thornton R. Calkins titled AN INJECTION MOLDABLE THERMOSETTABLE COMPOSITION AND PROCESS, filed on the same day as the instant application which in turn is a continuation-in-part of patent application Ser. No. 303,844, filed Nov. 6, 1972 and now abandoned, that injection moldable thermosettable compositions can be prepared in pellet form having in admixture with the pellets certain materials, the compositions lacked the critical feature of being dust free. As is known, the dusting of materials is becoming a critical feature within the various industries because of the health situation arising through dust that may occur in the various manufacturing operations.

DESCRIPTION OF THE INVENTION

It has now been surprisingly discovered that an improved heat fusible thermosettable phenol aldehyde molding resin composition can be prepared which is essentially completely dust free, is suitable for injection molding in apparatus used for the injection molding of thermoplastics, is generally glossy in appearance but not essential, has a high density, has uniform pellet size and has extreme ease in molding and handling. The pellets employed in the practice of this invention are those prepared in accordance with and described in Applicant's co-pending patent application Ser. No. 500,113 filed Aug. 23, 1974 of Thornton R. Calkins titled AN INJECTION MOLDABLE THERMOSETTABLE COMPOSITION AND PROCESS, filed on the same day as the instant application which in turn is a continuation in part of patent application Ser. No. 303,844 filed Nov. 6, 1972 and now abandoned, which discloses the pellets prepared in accordance therewith for use in injection molding apparatus.

It has now been discovered that these pellets can be made dust free with excellent molding characteristics as described above. The pellets are prepared and made dust free by blending the pellets with a particular composition which in turn uniformly coats the pellets to provide pellets which are dust free and may be glossy and are injection moldable. The composition applied to the pellets may be applied by any of the known ways of mixing or blending ingredients. The resulting pellets are essentially coated with the composition and are thus dust free.

The particular coating employed in the practice of this invention comprises a mixture of (1) a metallic salt of a long chain fatty acid of 8–20 carbon atoms and (2) a particular material which may be either an alkyl ester of an aromatic acid, or an alkyl ester of an aliphatic acid, either of which may be used alone or in combination with a polyglycol or a polyglycol ester, or mixtures of the polyglycol and polyglycol ester. It has been discovered that the use of either one of these component parts does not in itself provide a dust free pellet for injection molding.

It is the combination of these ingredients that is necessary to provide the dust free injection moldable thermosettable pellets of the instant invention.

PREFERRED EMBODIMENT OF THE INVENTION

The following examples are set forth to illustrate more clearly the principle and practice of this invention to those skilled in the art and unless otherwise specified, where parts or percentages are mentioned, they are parts or percentages by weight.

EXAMPLE I

A phenol-formaldehyde resin is prepared by reacting about 0.7 moles of formaldehyde per mole of phenol in the presence of an acid catalyst, which is subsequently neutralized, to form a novolac.

The novolac is ground to a fine particle size with about 16 weight percent of hexamethylenetetramine based on the weight of novolac. The resin mixture is then blended with about 35 weight percent of asbestos fibers and about 15 percent weight of wood flour to form a 50/50 mixture. The blend is then compounded in a screw extruder at about 220°F which is sufficient to melt the resin. The molten mixture is advanced through the screw extruder and extruded through a die orifice of about one-eighth inch in diameter. The extrudate is then comminuted into pellets of about one-eighth inch long. The pellets are cooled rapidly to prevent advancement in molecular weight of the resin and to prevent coagulation of the pellets. The pellets are essentially uniform in size.

The pellets are then blended in a container on rolls with a composition consisting of 0.3 part of dibutyl phthalate and 0.1 part of zinc stearate per 100 parts of the pellets. The material is blended for about 10 minutes.

The resulting pellets are free flowing, completely dust free with a glossy surface. After standing for 3 months, the pellets are still free flowing, dust free and have a glossy surface.

EXAMPLE II

Example I is repeated except that the pellets are blended with a composition consisting of 0.2 part of dibutyl phthalate, 0.1 part of polyethylene glycol monooleate and 0.1 part of zinc stearate.

The results obtained are the same as in Example I.

EXAMPLE III

Example I is repeated except that the pellets are blended with only 0.3 part of dibutyl phthalate.

The resulting pellets are damp, have a dull coating, but are dust free. After one (1) month of standing, the pellets are extremely dusty.

EXAMPLE IV

Example I is repeated except that the pellets are blended with 0.1 part of zinc stearate alone.

The resulting pellets are dusty and dull in appearance.

EXAMPLE V

Example I is repeated except that the pellets are blended with the following compositions:
a.
  0.3 part of dibutyl phthalate
  0.1 part of calcium stearate
b.
  0.3 part of dibutyl phthalate
  0.1 part of lithium stearate
c.
  0.7 part of diethyl phthalate
  0.25 part of calcium stearate
d.
  0.25 part diisooctyl phthalate
  0.25 part of zinc stearate
  0.25 part of glycerol
e.
  0.5 part of dioctyl adipate
  0.1 part of zinc stearate
f.
  0.5 part of diisooctyl sebacate
  0.1 part of zinc stearate The results obtained with all of the above compositions are the same as in Example I.

The instant application is directed to an improved heat fusible thermosettable injection moldable phenol-aldehyde composition in pellet form having a diameter of at least one-sixteenth inch. The improvement in the composition consists of the pellets having a particular coating on the surface thereof. The particular coating comprises in admixture (1) a metallic salt of a long chain fatty acid of 8–20 carbon atoms and (2) a material which may be either (a) an alkyl ester of an aromatic acid, or (b) an alkyl ester of an aliphatic acid. In addition, (a) or (b) may be used alone or in admixture with each other or in admixture with a polyglycol, or a polyglycol ester, or with mixtures of the polyglycol and the polyglycol ester. The composition of the coating may be added to the pellets by any known conventional means such as blending in a jar on rolls, merely stirring in a container, a ribbon blender, etc. The coating ingredients may be added to the pellets either as a paste or as a hot liquid mixture or as a hot liquid solution or as a hot slurry or individually. For example, a paste may be made by dissolving the ingredients of the coating composition at an elevated temperature of about 120°C, which temperature is not critical, and then cooling to form a paste, which is then blended with the pellets. Alternatively, the coating composition may be left as a hot liquid and added to the pellets in that manner. The method of applying the coating composition of the instant invention is not critical. The preferred characteristic of the coating composition of this invention is such as to result in either the wetting of or the dissolving of, partially or completely, the metallic salt of the long chain fatty acid component. The coating composition must further be one which has a low volatility at room temperature and must be one which has a low rate of absorption into the pellet. While the resulting pellets generally have been found to be glossy in surface appearance, this is not always a necessary feature of the instant invention. For example, the pellets with a suitable coating of the instant invention can be dull in appearance.

In the practice of the instant invention the metallic salts of long chain fatty acids that can be employed herein in place of the zinc stearate used in the examples with the same results occurring are lithium, sodium, potassium, manganese, calcium, barium, zinc, cadmium, and aluminum salts of saturated or unsaturated monobasic or dibasic, branched or straight chain fatty acids of 8–20 carbon atoms. Such acids that may be included within the practice of this invention but are not limited thereto are palmitic, stearic, lauric, oleic, pimelic, sebacic, adipic, ricinoleic, and palmitoleic.

The amount of the coating to be employed can vary anywhere from 0.05 to 2.0 parts per 100 parts of the pellets. The component parts of the coating composition may vary from 0.5 to 10 parts of the alkyl ester of an aromatic acid or alkyl ester ester of an aliphatic acid or a mixture of these per one part of the metallic salt of a long chain fatty acid. Obviously, part of the ester portion of the coating composition can consist of the polyglycol or the polyglycol ester or mixture thereof. This portion can preferably be 20–50 weight percent of the ester part of the coating composition.

In the practice of this invention, some of the alkyl esters of aromatic acids and alkyl esters of aliphatic acids that can be employed herein are:
  diethyl phthalate
  diethyl isophthalate
  dibutyl phthalate
  diamyl isophthalate
  di-2-ethoxyethyl phthalate
  butyl benzoate
  hexylbenzoate
  ethyl-2-chlorobenzoate
  ethyl-3-methoxy benzoate
  methyl-3-methyl benzoate
  dibutoxyethyl phthalate
  butyl octyl phthalate
  dioctyl adipate
  diisooctyl sebacate
  butyl oleate
  dibutyl sebecate
  diisodecyl adipate
  di(2 ethyl hexyl) adipate
  dibenzyl sebacate and combinations or mixtures thereof. In addition, some of the polyglycols and polyglycol esters that can be employed in the practice of this invention are:
  glycerine
  glycerol esters of fatty acids of 8–20 carbon atoms
  polyethylene glycol
  polypropylene glycol
  glyceryl monooleate
  polyethylene glycol dioctoate
  polyethylene glycol monooleate The pellets of the instant application are prepared by feeding to a screw extruder a thermosettable phenol-aldehyde composition, which composition consists of a phenol-aldehyde resin, a cross linking agent, and fillers.

The composition is advanced through the screw extruder while being subjected to a temperature of less than 290°F and preferably 200°F to 240°F which must be sufficient to render the phenol-aldehyde resin molten. The composition is advanced through the screw extruder and extruded through a die orifice of at least one-sixteenth inch in diameter and preferably about one-eighth inch in diameter. The extrudate is then comminuted into pellets and can be, if necessary, rapidly cooled to prevent advancement of the phenol-aldehyde resin and to prevent pellet agglomeration.

The term "pellet" herein means a solid of any shape including spherical, cylindrical, ellipsoidal, etc. and any variations of these shapes. However, the pellet must have one dimension of at least one-sixteenth inch.

The phenol-aldehyde resin employed in the practice of this invention can be any phenol-aldehyde resin which is prepared by reacting from less than one mole to more than one mole of an aldehyde per mole of phenol under certain conditions to provide a resin. If less than one mole of an aldehyde is used, the resin so produced is commonly called a novolac. The novolac resin is generally the type that can be finely ground and requires blending thereof with an external crosslinking agent such as hexamethylenetetramine in order to provide a thermosettable resin which can be advanced to an infusible state upon exposure to elevated temperatures. While any external crosslinking agent can be employed herein, the preferred external crosslinking agent is hexamethylenetetramine. Generally, the preferred range of aldehyde employed herein to provide the novolac is 0.5–0.9 moles thereof per mole of phenol and preferably 0.6–0.8 moles thereof. While any aldehyde can be employed herein such as formaldehyde, paraformaldehyde, acetaldehyde, butyraldehyde, furfuraldehyde, etc., the preferred aldehyde to be employed herein is formaldehyde.

When employing more than one mole of aldehyde per mole of phenol, a one-stage resin is produced which can be advanced to an infusible state by the mere application of elevated temperatures. The one-stage resin which can be employed herein is one prepared by reacting more than one mole of an aldehyde per mole of phenol and preferably 1.3–3.0 moles thereof. Again, the preferred aldehyde is formaldehyde. The one-stage resin best suited for the preparation of molding compounds is in the powdered form.

The fillers that can be employed herein are well known in the phenolic molding compound art. These fillers include such materials as asbestos fibers, wood flour, cotton flock, cellulose flock, wool flock, aluminum silicate, calcium carbonate, talc, glass fibers, etc., and any combination of these or other known fillers employed in the phenolic molding composition art. In addition, there is also employed such additives as lime, stearic acid, etc.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A coated heat fusible thermosettable injection moldable phenol-aldehyde pellet consisting essentially of a phenol-aldehyde resin, crosslinking agents and fillers having a diameter of at least one-sixteenth inch which comprises the pellets having a coating on the surface thereof wherein said coating comprises in admixture (1) a metallic salt of a long chain fatty acid of 8–20 carbon atoms and (2) a material selected from the group consisting of (a) a alkyl ester of an aromatic acid, (b) an alkyl ester of an aliphatic acid, (c) mixtures of (a) and (b), and (d) mixtures selected from the group consisting of (a), (b), and (c) with a material selected from the group consisting of polyglycols, polyglycol esters and mixtures of polyglycols and polyglycol esters; wherein said coating composition contains 0.5 to 10 parts of (2) per 1 part of (1).

2. The coated phenol-aldehyde pellets of claim 1 wherein the metallic salt of a long chain fatty acid is zinc stearate.

3. The coated phenol-aldehyde pellets of claim 1 wherein the alkyl ester of an aromatic acid is dibutyl phthalate.

4. The coated phenol-aldehyde pellets of claim 1 wherein the alkyl ester of an aliphatic acid is diisooctyl sebacate.

5. The coated phenol-aldehyde pellets of claim 1 wherein the polyglycol ester is polyethylene glycol monooleate.

6. The coated phenol-aldehyde pellets of claim 1 wherein the coating consists of 0.5 part of coating per 100 parts of pellets.

7. The coated phenol-aldehyde pellets of claim 1 wherein the coating composition consists of zinc stearate and dibutyl phthalate.

8. The coated phenol-aldehyde pellets of claim 1 wherein the coating composition consists of 0.1 part of zinc stearate, 0.2 part of dibutyl phthalate and 0.1 part of polyethylene glycol monooleate based on 100 parts of pellets.

* * * * *